(12) United States Patent
Gale et al.

(10) Patent No.: US 8,542,630 B2
(45) Date of Patent: Sep. 24, 2013

(54) SHARED RADIO BACKHAUL SYSTEM

(75) Inventors: Simon Gale, Bishops Stortford (GB); Andrew Urquhart, Bishops Stortford (GB); James Mark Naden, Hertford (GB)

(73) Assignee: Apple Inc., Cupertino, CA (US)

( * ) Notice: Subject to any disclaimer, the term of this patent is extended or adjusted under 35 U.S.C. 154(b) by 1192 days.

(21) Appl. No.: 12/015,235

(22) Filed: Jan. 16, 2008

(65) Prior Publication Data

US 2008/0181183 A1 Jul. 31, 2008

(30) Foreign Application Priority Data

Jan. 16, 2007 (GB) .................................. 0700801.4
May 25, 2007 (GB) .................................. 0710077.9

(51) Int. Cl.
*H04W 4/00* (2009.01)
(52) U.S. Cl.
USPC .......................................... 370/328; 370/338
(58) Field of Classification Search
None
See application file for complete search history.

(56) References Cited

U.S. PATENT DOCUMENTS

| | | | |
|---|---|---|---|
| 6,539,010 B1 | 3/2003 | Hagerman | |
| 6,781,997 B1 * | 8/2004 | Vollmer et al. | 370/395.41 |
| 7,071,791 B1 * | 7/2006 | Wilson, III | 333/17.1 |
| 2004/0062214 A1 | 4/2004 | Schnack | |
| 2005/0088980 A1 * | 4/2005 | Olkkonen et al. | 370/255 |
| 2005/0124294 A1 * | 6/2005 | Wentink | 455/41.2 |
| 2005/0245265 A1 * | 11/2005 | Nascimbene et al. | 455/447 |
| 2007/0021117 A1 | 1/2007 | McKenna | |
| 2008/0090575 A1 * | 4/2008 | Barak et al. | 455/444 |
| 2009/0197544 A1 * | 8/2009 | Petersson et al. | 455/73 |
| 2011/0267960 A1 | 11/2011 | Beale | |

FOREIGN PATENT DOCUMENTS

WO WO-01/54431 A1 7/2001

OTHER PUBLICATIONS

Search report for PCT/EP2008/050473, filed Jan. 16, 2008.

* cited by examiner

*Primary Examiner* — Faruk Hamza
*Assistant Examiner* — Tito Pham
(74) *Attorney, Agent, or Firm* — Meyertons, Hood, Kivlin, Kowert & Goetzel, P.C.

(57) ABSTRACT

Embodiments of the invention relate to wireless communications networks, and more specifically to method and apparatus relating to wireless backhaul for cellular wireless systems. Increasing data capacity of cellular wireless systems places increasing demands on the capacity of the two way connection, known as backhaul, between a cellular base station and a telecommunications network such as the PSTN backhaul, since this is the connection that has to convey the wireless-originating traffic to its destination, often in an entirely different network. Known backhaul links include leased lines, microwave links, optical fibre links or radio resources for relaying backhaul traffic between base stations. The fixed line solutions are expensive to implement and maintain, while the radio solutions suffer from interference from transmissions between base stations with transmissions from user equipment to base stations which are not communicating with other base stations. In embodiments of the invention, the relaying of access data between base stations utilises radio resources other than radio resources used by transmissions from user equipment within an area of contiguous wireless coverage. The benefit of this approach is that it provides a means of avoiding interference between inter-base station transmissions and user equipment to base station transmissions.

16 Claims, 13 Drawing Sheets

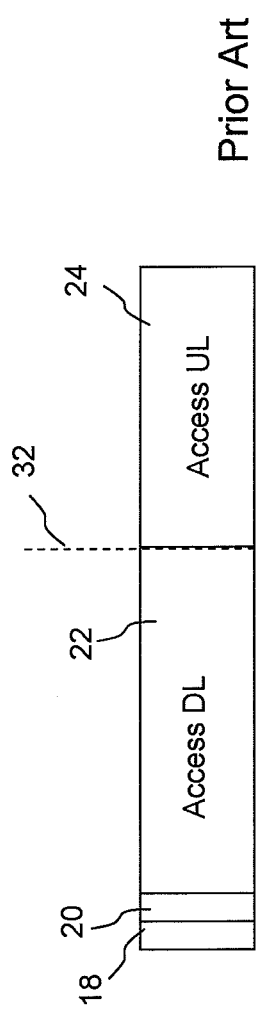
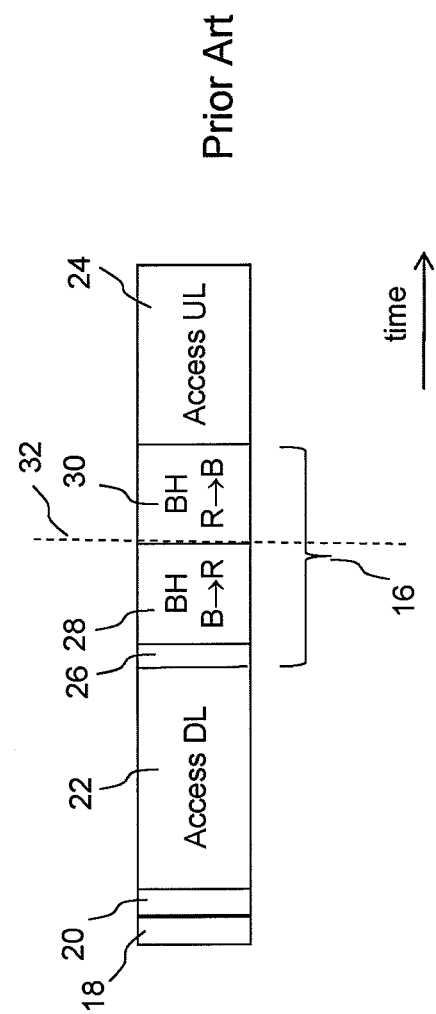

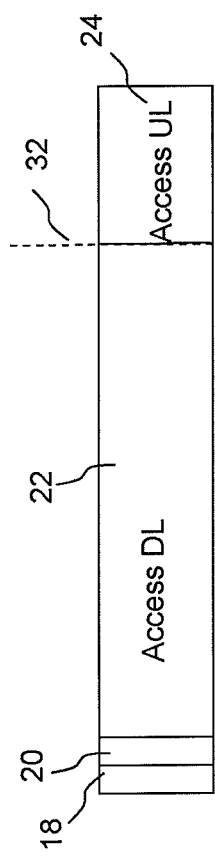
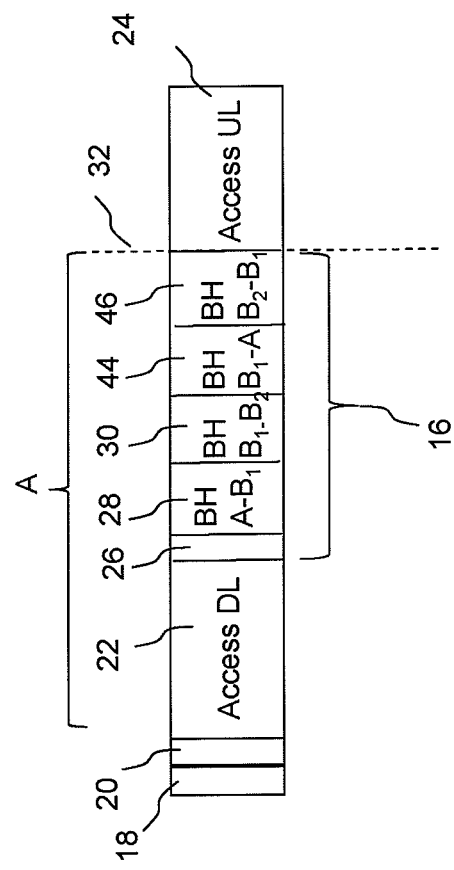

SHARED RADIO BACKHAUL SYSTEM

FIELD OF THE INVENTION

The present invention relates generally to wireless communications networks, and more specifically to method and apparatus relating to wireless backhaul for cellular wireless systems.

BACKGROUND OF THE INVENTION

Mobile telephony systems, in which user equipment such as mobile handsets communicate via wireless links to a network of base stations connected to a telecommunications network, have undergone rapid development through a number of generations. The initial deployment of systems using analogue modulation has been superseded by second generation digital systems, which are themselves currently being superseded by third generation digital systems such as UMTS and CDMA. Third generation standards provide for a greater throughput of data than is provided by second generation systems; this trend is continued with the proposal by the Third Generation Partnership Project of the so-called Long Term Evolution system, often simply called LTE, which offers potentially greater capacity still, by the use of wider frequency bands, spectrally efficient modulation techniques and potentially also the exploitation of spatially diverse propagation paths to increase capacity (Multiple In Multiple Out).

Distinct from mobile telephony systems, wireless access systems have also undergone development, initially aimed at providing the "last mile" (or thereabouts) connection between user equipment at a subscriber's premises and the public switched telephone network (PSTN). Such user equipment is typically a terminal to which a telephone or computer is connected, and with early systems there was no provision for mobility or roaming of the user equipment between base stations. However, the WiMax standard (IEEE 802.16) has provided a means for such terminals to connect to the PSTN via high data rate wireless access systems.

Whilst WiMax and LTE have evolved via different routes, both can be characterised as high capacity wireless data systems that serve a similar purpose, typically using similar technology, and in addition both are deployed in a cellular layout as cellular wireless systems. Typically such cellular wireless systems comprise user equipment such as mobile telephony handsets or wireless terminals, a number of base stations, each potentially communicating over what are termed access links with many user equipments located in a coverage area known as a cell, and a two way connection, known as backhaul, between each base station and a telecommunications network such as the PSTN.

As the data capacity of cellular wireless systems increases, this in turn places increasing demands on the capacity of the backhaul, since this is the connection that has to convey the wireless-originating traffic to its destination, often in an entirely different network. For earlier generations of cellular wireless systems, the backhaul has been provided by one or more connections leased from another telecommunications operator (where such a connection exists near to the base station); however, in view of the increasing data rates, the number of leased lines that is required is also increasing. Consequently, the operational expense associated with adopting multiple leased lines has also increased, making this a potentially expensive option for high capacity systems.

As an alternative to leased lines, dedicated backhaul links can be provided by a variety of methods including microwave links or optical fibre links. However each of these methods of backhaul has associated costs. Dedicated fibre links can be expensive in terms of capital expense due mainly to the cost of the civil works in installation, and this problem is especially acute in urban areas. Microwave links also involve the capital expense of equipment and require expert installation due to narrow beam widths leading to the requirement for precise alignment of antennas.

As an alternative to the provision of a dedicated backhaul link for each individual base station, it is possible to use the radio resource of the cellular wireless system to relay backhaul traffic from one base station to another. Typically, the base station using the cellular radio resource for backhaul is a small low power base station with an omnidirectional antenna known as a relay node. Such a system can be used to extend the area of cellular wireless coverage beyond the area of coverage of conventional base stations that are already equipped with a dedicated backhaul.

FIG. 1 shows a conventional wireless cellular network; in this example, base stations 2a . . . 2g are connected by microwave links 4a . . . 4c to a microwave station 6 and thence to a telecommunications network 8.

FIG. 2 shows a conventional relay node operating within a cellular wireless network; the operation may for example be in accordance with IEEE 802.16j. A user equipment 12b is in communication with a relay node base station 10. As the relay node 10 is not provided with a backhaul link separate from the cellular wireless resource, the relay node is allocated radio resource timeslots for use relaying backhaul data to and from the adjacent base station 2 which is itself connected by microwave link to a microwave station 6 and thence to a telecommunications network 8 such as the public switched telephone network. A user equipment 12a is shown in communication with the base station 2.

FIG. 3 shows a conventional time frame structure allocating timeslots alternately to access 14a . . . 14d and backhaul 16a . . . 16c. Typically, all of the access payload data will be relayed by the backhaul link; if the spectral efficiency of the backhaul and access links is the same, then the access and backhaul timeslots will occupy approximately equal amounts of time. There may be a significant reduction in capacity available in the access links to the user equipment due to the need to reserve timeslots for backhaul.

Typically a relay node will be deployed within a wireless cellular network in which many of the base stations are equipped with dedicated backhaul connections such as microwave links and are typically not associated with other relay nodes. The allocation of timeslots for backhaul is localized around the relay node, so that, unlike the timeslot allocation depicted in FIG. 3, base stations which are not associated with relay nodes are typically not allocated backhaul timeslots at all. The allocation of timeslots to such base stations is illustrated in FIG. 4a, and accordingly indicates a typical time frame structure allocated to a base station with dedicated backhaul but which is not associated with a relay node. FIG. 4b, however, indicates a typical time frame structure that might be allocated when the base station is associated with relay nodes such that access payload data is relayed by the backhaul link (base stations and relay nodes having this relationship can be considered to be part of a relay zone); the operation may for example be in accordance with IEEE 802.16j.

The time frames shown in FIG. 4a and FIG. 4b repeat in time, so that for example the relay zone time frame as illustrated in FIG. 4b represents a section of the alternating backhaul and access timeslot sequence shown in FIG. 3.

In the case of the time frame structure of FIG. 4a for a base station with dedicated backhaul, the frame is divided into a downlink section 18, 20, 22 in which the base station transmits, and an uplink section 24 in which user equipments transmit. The division 32 between downlink and uplink timeslots is typically constant throughout a wireless network within an area of contiguous wireless coverage. This is to prevent the situation arising in which a base station is transmitting at the same time as another base station is receiving, since this could cause interference. As base stations are typically mounted on towers and transmit at high power, the interference could be propagated for a considerable distance.

In the case of the time frame structure of FIG. 4b for the relay zone, the frame is divided as before into a downlink section 18, 20, 22 in which the base station transmits to user equipments and an uplink section 24 in which user equipments transmit to the base station. A backhaul timeslot 16 is inserted between the access downlink 22 and access uplink 24 sections. The backhaul timeslot 16 is divided into a timeslot 26, 28 in which the base station transmits to a relay node and a timeslot 30 in which a relay node transmits to a base station. As a result, sections indicated by reference numerals 18, 20, 22, 26 and 28 represent timeslots when the base station is transmitting, and reference numerals 30 and 24 represent timeslots when the base station is receiving. It is important to note that conventionally the division 32 between the timeslots when the base station is transmitting and the timeslots when the base station is receiving is the same for base stations with dedicated backhaul as for base stations in a relay zone within an area of contiguous wireless coverage.

The conventional allocation of timeslots to backhaul as illustrated in FIGS. 4a and 4b has the benefit that it approximately maintains the proportion of time allocated to uplink and downlink access timeslots, and that the system can re-use the existing mechanisms that control the timing of the transition between transmission and reception modes. However, in the timeslot indicated by reference numeral 30 in FIG. 4b, the relay node is transmitting in part of the timeslot 24 in which base stations with conventional, i.e. dedicated, backhaul are receiving. If the relay node were mounted on a tower or were operating at high power, this would potentially cause interference to the access uplink of base stations with dedicated backhaul as has already been mentioned. This places restrictions on the operating power and siting of relay nodes or can restrict the performance of the network Hence it can be seen that backhaul links for high capacity cellular wireless systems can present a significant expense; to mitigate this, the cellular wireless resource can be used to relay backhaul links from one base station to another, but when employed in conventional arrangements, this incurs significant limitations to data capacity and restrictions on the positioning and transmission power of base stations.

SUMMARY OF THE INVENTION

In accordance with a first aspect of the present invention, there is provided a method of configuring a cellular wireless communications network comprising a first base station, a second base station, a further base station and a user equipment terminal, said network being located within an area of contiguous cellular wireless coverage, the method comprising:

configuring said first base station to transceive signals with a user equipment terminal according to a first frame format;

configuring said second base station to transceive signals with a user equipment terminal and with the further base station according to a second frame format; and configuring said further base station so as to transceive signals with a user equipment terminal and with the second base station according to the second frame format, in which the first frame format comprises a downlink portion for transmission of signals from the first base station to a user equipment terminal and an uplink portion for transmission of signals from said user equipment terminal to the first base station, and the transceiving of signals between said second and further base stations according to the second frame format occurs wholly within said downlink portion of the first frame format.

Thus according to embodiments of the invention, the first frame format is used for transmissions between a base station and a user equipment terminal and a second frame format is used to multiplex transmissions between base stations with transmissions between a base station and user equipment terminals.

As is known in the art, a frame format represents an allocation of radio resources, and includes slots that define use of the radio resources by various equipment for a variety of purposes; the frame format may allocate frequency slots and time slots. In a system that uses time division duplexing for transmission between user equipment and base stations, according to the first aspect of the present invention, timeslots allocated to transmissions between base stations in the second frame format will occur wholly within timeslots allocated to transmission from base stations to user equipment within the first format. Consequently transmissions between base stations will not occur when transmissions from user equipment are received at base stations. As a result, interference from transmissions between base stations to the reception of transmissions from user equipment at a base station that is operating according to the first frame format is avoided.

In a system that uses frequency division duplexing of the links between user equipment and base stations, frequencies allocated to transmissions between base stations according to the second frame format will be wholly within frequency allocations associated with signals that are transmitted from base stations to user equipment according to the first format. Consequently, transmissions between base stations do not occur within the frequency allocation used for transmissions from user equipment to base stations. As a result, interference from transmissions between base stations to the reception of transmissions from user equipment at a base station that is operating according to the first frame format is avoided.

Preferably signals are transmitted between a base station and user equipment using a bespoke antenna system comprising a first antenna system and a second antenna system. The first antenna system is configured to transceive signals between user equipment and a base station, while signals transceived between a base station and a second base station use the second, different, antenna system. Preferably each antenna system is configured so as to be optimised for the job it is to perform: for example, the first antenna system may be designed to optimise wireless coverage within a cellular wireless system so as to transceive signals with user equipment, while the second antenna system may be designed to give a narrower beam in azimuth for use in transceiving signals between base stations. The latter enables the beam to be directed towards a given base station and thereby optimise antenna gain in the direction of that base station, while rejecting interference received from other directions.

In relation to the configuration of the antenna system, preferably a message is decoded indicating a switching point with respect to a count value on a counter and a characteristic is detected representing a power output of the transceiver as a function of time. The counter is synchronised with the characteristic and transmission and reception is switched between the first and second antenna systems according to the count value and the switching point. As a result the message and the power output of a transceiver are carried to the antenna system on existing cables between the transceiver and the antenna system, so that no new cabling is required to control the switched antenna system in comparison with a non-switched antenna system.

Advantageously, the second antenna system comprises an antenna array having a plurality of antenna elements and the first antenna system comprises a sub-set of said antenna elements. The benefit of this is that the surface area of the antenna system is reduced compared to the use of separate antennas which reduces wind loading. In addition, component cost may be reduced.

Further features and advantages of the invention will become apparent from the following description of preferred embodiments of the invention, given by way of example only, which is made with reference to the accompanying drawings.

BRIEF DESCRIPTION OF THE DRAWINGS

FIG. 4a is a schematic diagram showing a conventional frame structure for a base station with access components only;

FIG. 4b is a schematic diagram showing a conventional frame structure enabling timesharing between backhaul and access components;

FIG. 8a is a schematic diagram showing a conventional frame structure in a time division duplexed system;

FIG. 8b is a schematic diagram showing a frame structure according to an embodiment of the invention applicable to a network employing wireless backhaul with a multi-hop structure;

DETAILED DESCRIPTION OF THE INVENTION

In general, the present invention is directed to methods and apparatus that provide backhaul by using the cellular wireless resource within a cellular wireless system. For clarity, the methods and apparatus are described in the context of a high speed packet data system such as IEEE802.16 (WiMax) or LTE, but it will be appreciated that this is by way of example and that the methods and apparatus described are not limited to these examples.

Figure 1:
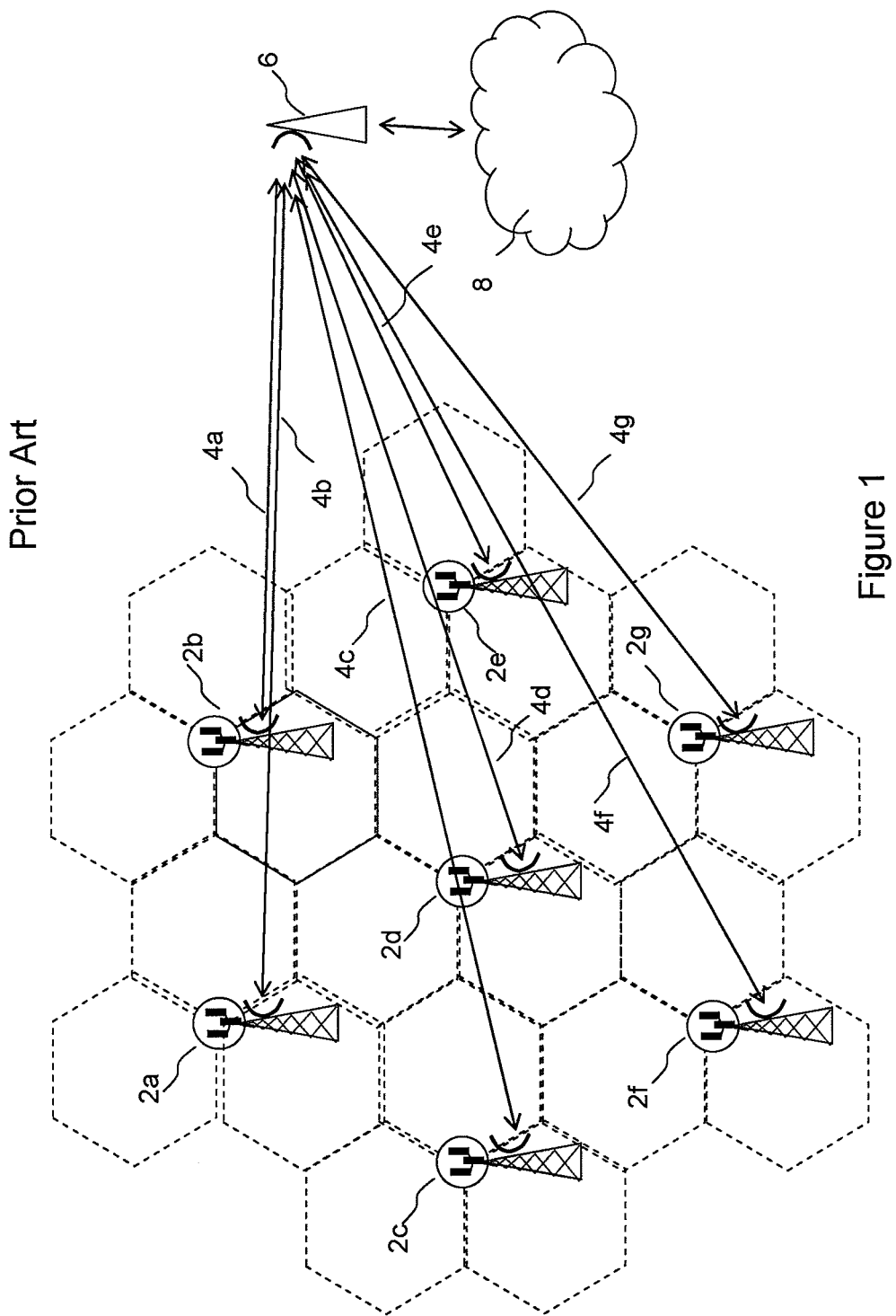
FIG. 1 is a schematic diagram showing a conventional wireless cellular network employing microwave links to enable backhaul connections to a telecommunications network.
Figure 2:
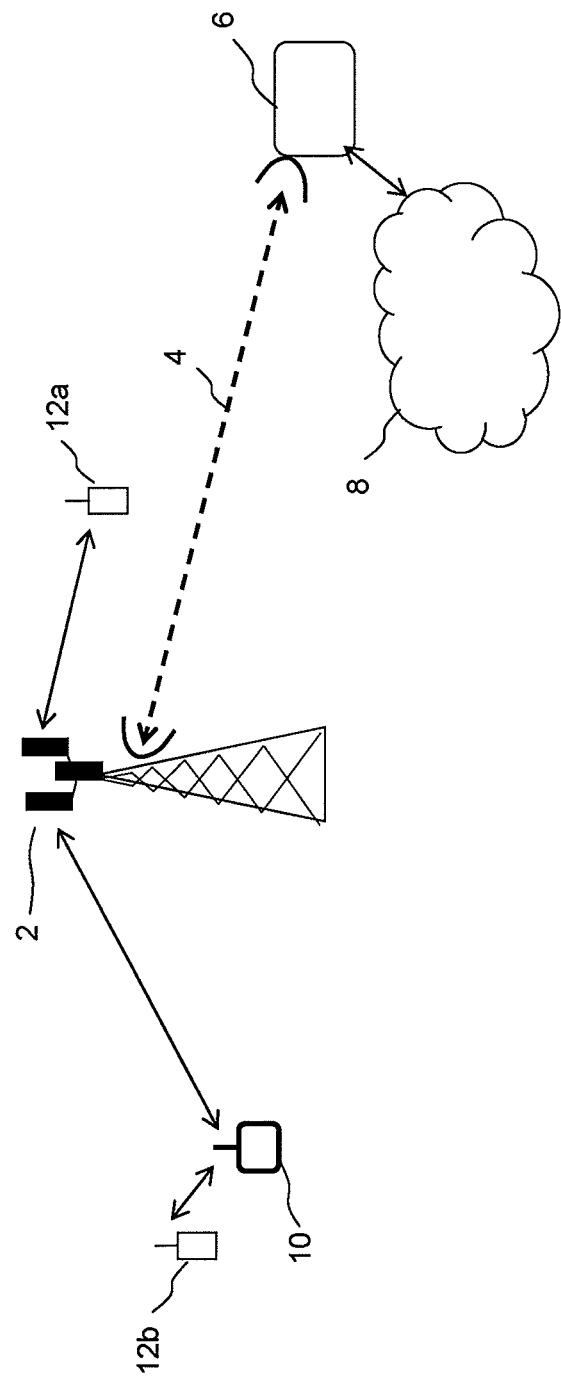
FIG. 2 is a schematic diagram showing a conventional relay node in communication with a base station.
Figure 3:
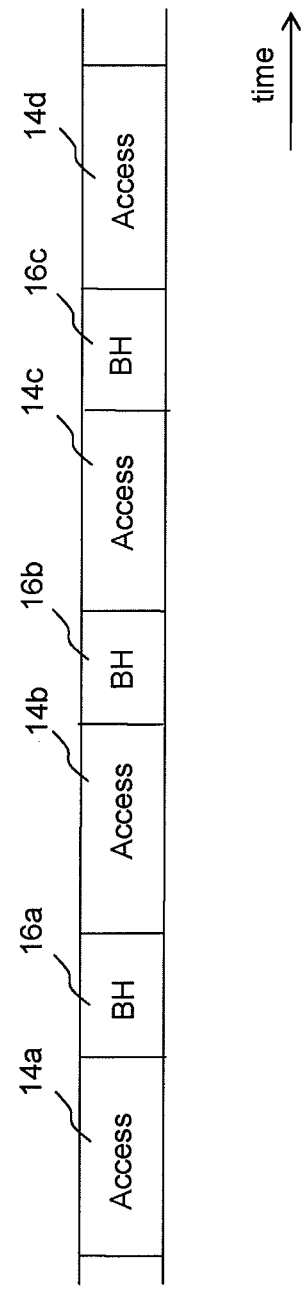
FIG. 3 is a schematic diagram showing a conventional frame structure enabling timesharing between backhaul and access components within a local area.
Figure 5A:
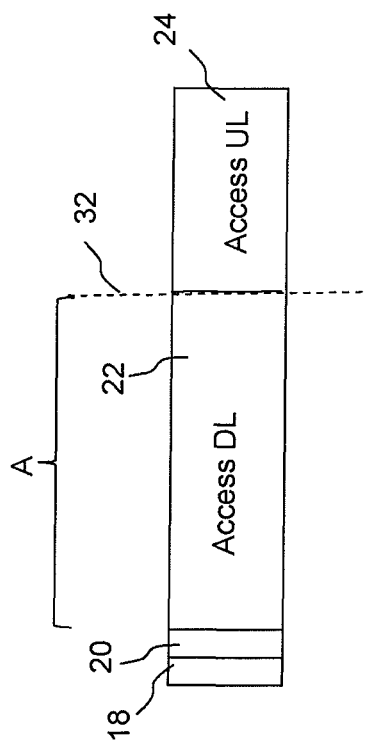
FIG. 5a is a schematic diagram showing a conventional frame structure in a time division duplexed system.
Figure 5B:
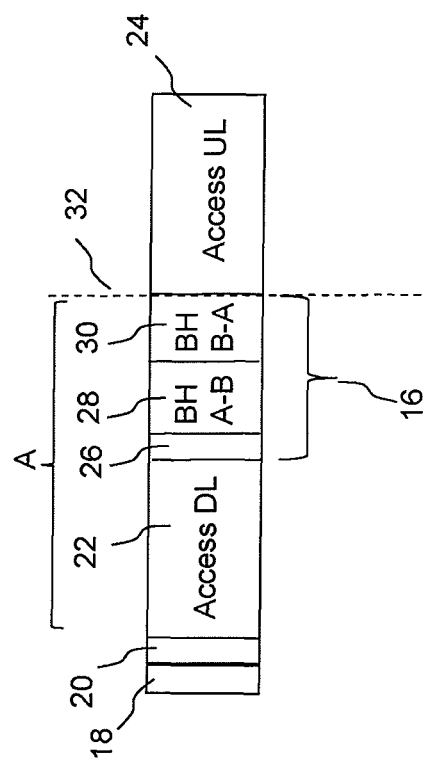
FIG. 5b is a schematic diagram showing a frame structure according to an embodiment of the invention in a time division duplexed system.
Figure 6:
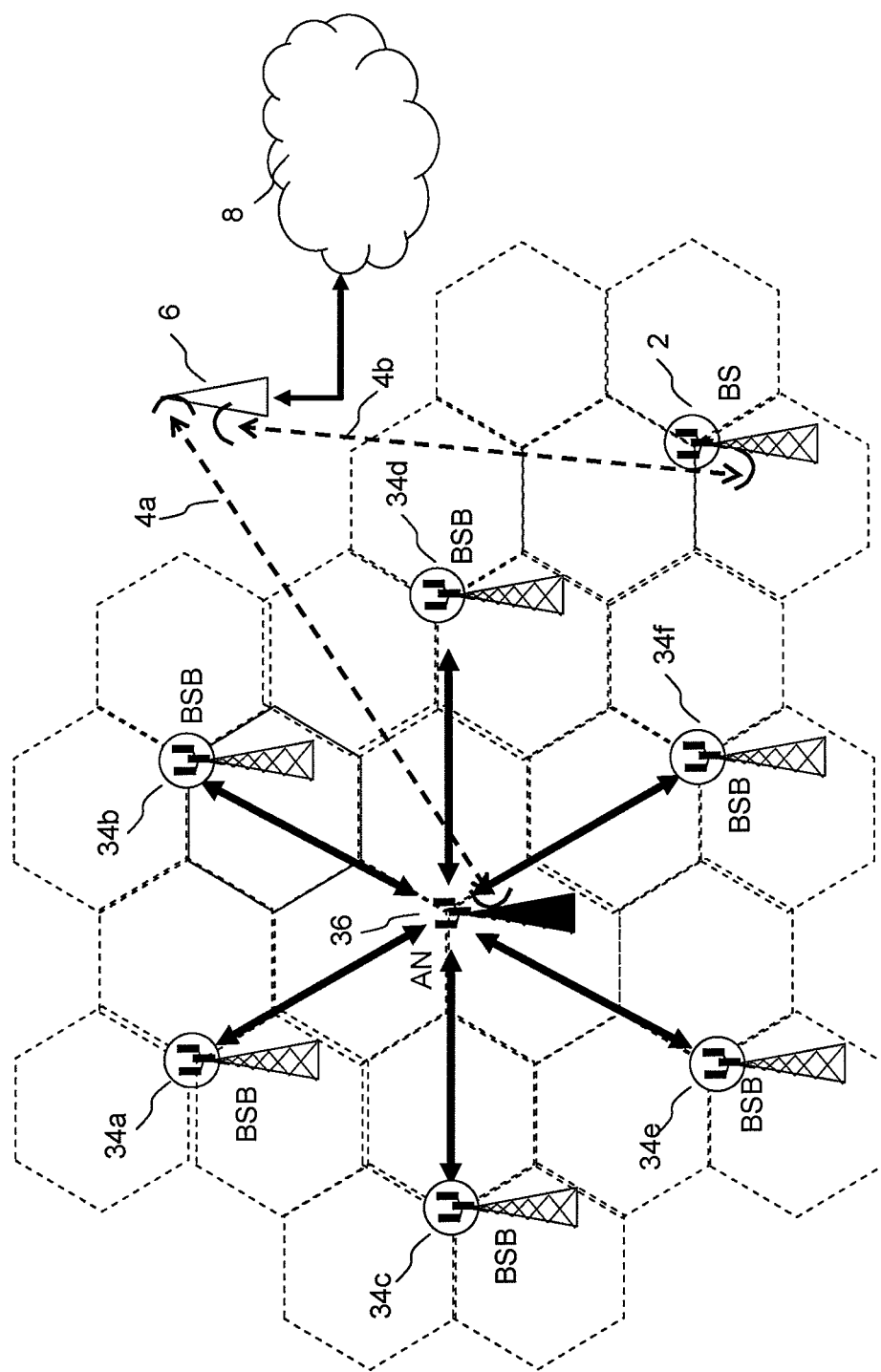
FIG. 6 is a schematic diagram showing a cellular wireless network enabled by the implementation of the frame structure of FIG. 5b.

FIG. 5b shows a frame structure according to a first embodiment of the invention, and FIG. 6 illustrates connections within a wireless network that are enabled by the frame structure of FIG. 5b. FIG. 6 shows a base station 36 known as an aggregation node. This base station has a microwave backhaul link 4a to a microwave station 6 and thence to a telecommunications network 8 such as the PSTN. In this example, six base stations 34a ... 34f known as base stations with backhaul (BSB) are connected to the aggregation node (AN) by means of backhaul using the radio resource. Accordingly, the frame structure of FIG. 5b is applicable to the links between the BSBs 34a ... 34f and the aggregation node 36. Also shown in FIG. 6 is a base station 2 which is not backhaul enabled using radio resource; the frame structure applicable to this base station is shown in FIG. 5a.

It can be seen that in contrast to the conventional frame structure illustrated in FIGS. 4a and 4b, all of the backhaul timeslots 26, 28, 30 are transmitted within the access downlink timeslot A. As a result, there are no backhaul transmissions at times corresponding to the access uplink timeslot 24 utilised by base stations that have dedicated backhaul links (per FIG. 5a). This has the beneficial effect of removing the potential for interference with the access uplink to base stations that are not allocated backhaul timeslots. As a result, it may be possible to transmit backhaul links at a higher power than would have been possible using a conventional frame structure and to site the antennas associated with base stations involved with backhaul on towers without a detrimental effect on access uplink performance. The benefit of transmitting backhaul links at a higher power and transmitting from towers is that the signal may be received with a higher signal to noise plus interference ratio, so that a higher data throughput rate can be achieved by the use of adaptive modulation and coding. The benefit of a higher data throughput rate in the backhaul links is that the time allocated to backhaul can be reduced; this releases radio resource for use in the access portion of the network and so potentially increases the data capacity of the network.

The received signal to noise plus interference ratio can be further enhanced by equipping base stations with antennas optimized for backhaul and access modes respectively and switching between them in synchronization with the access and backhaul timeslots. One Exemplary arrangement will be described in more detail below.

Figure 7:
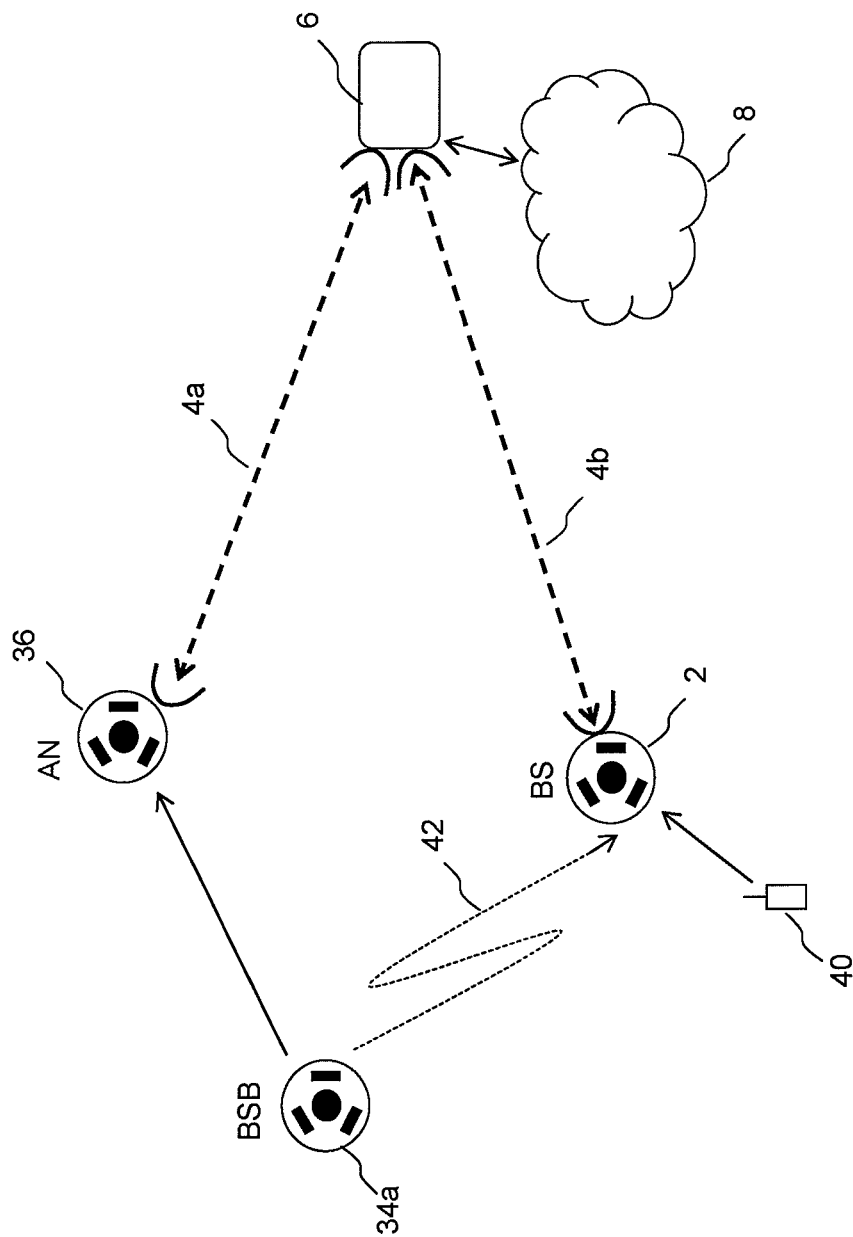
FIG. 7 is a schematic diagram illustrating the avoidance of interference by the implementation of the frame structure of FIG. 5b in the network of FIG. 6.

As a further benefit, it may be possible to employ backhaul using the radio resource widely throughout a network without interference effects from the backhaul transmissions limiting the performance of the uplink access links. FIG. 7 illustrates how the frame structure of FIG. 5b can prevent interference to the access uplink. A backhaul transmission is shown from a BSB 34*a* to the aggregation node 36. It can be seen that some of the transmission will be received at the base station 2 that is not enabled for radio resource backhaul. The propagation path will be dependent on the deployment: it may be for example a reflection from an obstruction or direct radiation from the antenna at the BSB 34*a*. An access uplink transmission is shown from a user equipment terminal 40 to the base station 2. To prevent interference, it is necessary for the transmissions from the BSB 34*a* and the user terminal 40 to occur at different times or on different frequencies. The approach taken as illustrated by the frame structure of FIG. 5*b* is to ensure that the transmissions occur at different times.

Returning to FIGS. 5*a* and 5*b*, reference numeral 18 refers to a preamble, for use in synchronization, and reference numeral 20 refers to a so-called Map, which allocates radio resource blocks to users. As described above, portions referred to by reference numeral 22 convey data payload on the access downlink to user equipment terminals. The section indicated by the reference numeral 26 is a Map for the backhaul section, indicating radio resource blocks and adaptive modulation and coding states to be used in the links between base stations. The backhaul payload sections 28, 30 are time division duplexed to enable communication between base stations. As shown, the section indicated by reference numeral 28 is allocated to transmission (with reference to FIG. 6) from an access node 36 to a base station with backhaul 34*a* and the section indicated by reference numeral 30 is allocated to transmission (with reference to FIG. 6) from a base station with backhaul 34*a* to an access node 36. Sections indicated by reference numeral 24 are allocated to access uplink, from user equipment terminals to the base station.

As has already been mentioned, there are two reasons for the positioning the backhaul timeslots as shown in FIG. 5*b*: to maintain the ratio between access uplink 24 and downlink 22 timeslots in a base station enabled for radio resource backhaul, and to utilize existing mechanisms for timing the transition between base station transmission and reception modes. Configuring the backhaul transmissions to occur within the access downlink timeslot A has the effect of changing the ratio between access downlink and uplink timeslots at base stations that are enabled for radio resource backhaul compared with those that are not. Whether this is tolerable depends on the application and is a matter of detailed system design. In many rural scenarios, it is expected that the capacity of the uplink is likely to be more limited than the downlink, due to the limited transmission power of user equipment and the large cell sizes. In such a scenario, it may be beneficial to use spare capacity in the downlink timeslots to enable radio resource backhaul. Also, the use of radio resource for backhaul is aimed at the initial deployment of networks before the demand for capacity has built up; in this case, the capacity of neither the uplink or the downlink is likely to be limited.

In the frame structure of FIG. 5*b*, the aggregation node base station 36 associated with the frame structure will transmit in the timeslots indicated by the reference numerals 18, 20, 22, 26 and 28 and receive in the timeslots indicated by reference numerals 30 and 24. The transition between transmission and reception modes is thus out of step with that of base stations that do not have radio resource backhaul enabled such as base station 2 (for which the frame structure shown in FIG. 5*a* applies). The timing as illustrated in FIGS. 5*a* and 5*b* is shown measured at the base station; to achieve the alignment of uplink transmissions in the presence of propagation delays, it is necessary to advance the timing of each user equipment terminal on the basis of a measurement of the propagation delay. In one arrangement, this process of correcting for round trip timing is applied to timeslot 30 in addition to the access uplink timeslot 24.

Figure 9:
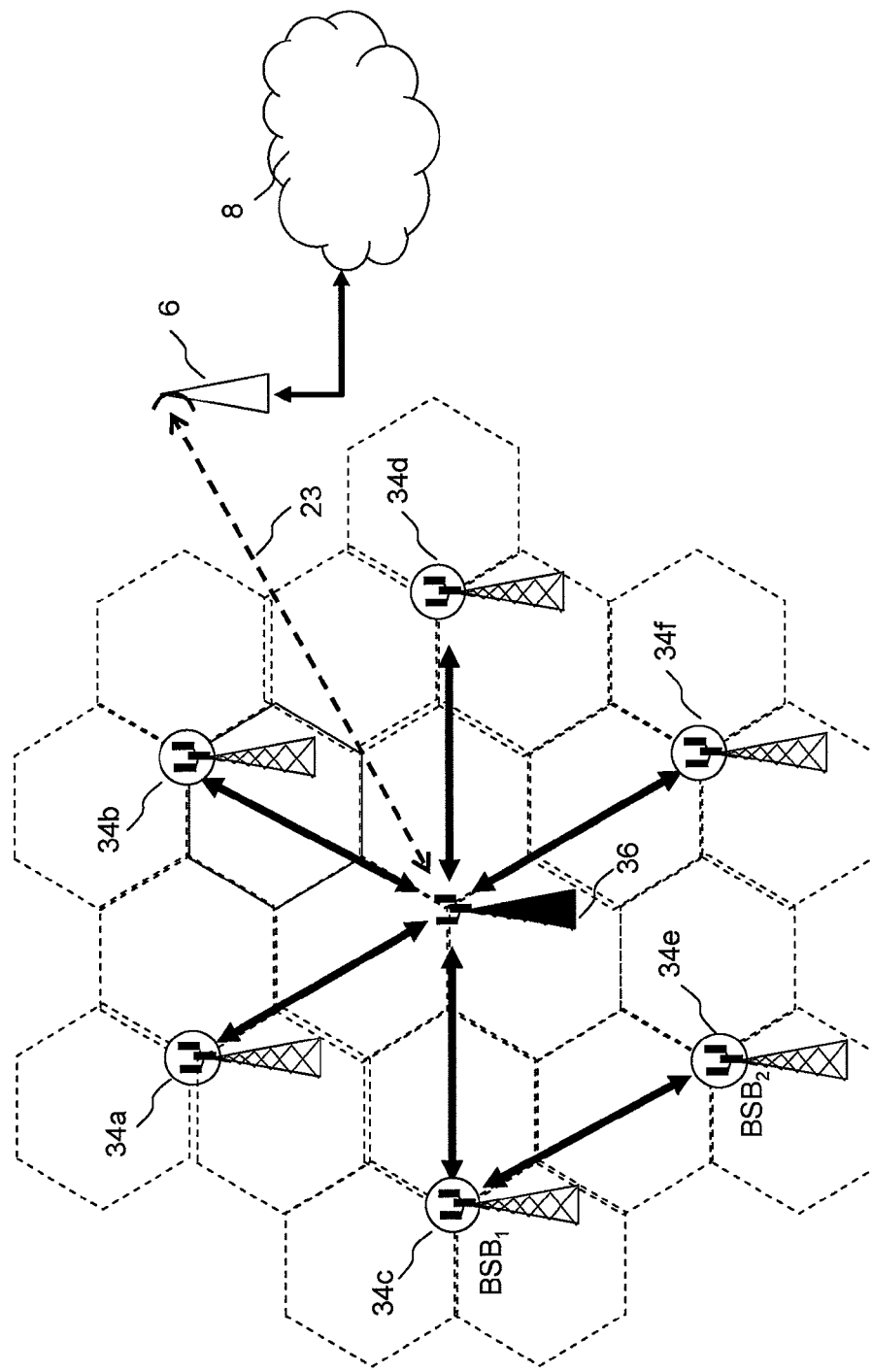
FIG. 9 is a schematic diagram showing a cellular wireless network with a multi-hop wireless backhaul structure enabled by the implementation of the frame structure of FIG. 8b.

It is possible to configure the radio resource backhaul as a multi-hop network, as illustrated in FIG. 9: the base station indicated by reference numeral 34*e* has a backhaul connection using the radio resource to the base station indicated by the reference numeral 34*c*, which is itself connected to the aggregation node 36. This multi-hop configuration may be required when for example there is an obstruction between the base station indicated by reference numeral 34*e* and the aggregation node 36, or if an equipment failure has occurred.

An embodiment of the invention is shown by the frame structure in FIG. 8*b*, for use with a multi-hop network such as is illustrated in FIG. 9. FIG. 8*a* is a schematic diagram showing a conventional frame structure in a time division duplexed system for comparison with FIG. 8*b*. FIG. 8*b* refers to the frame structure applicable to the link between base stations indicated by reference numerals 36, 34*c* and 34*e*. It can be seen that the frame structure of FIG. 8*b* differs from that of FIG. 5*b* in that the backhaul section 16 is divided into transmission timeslots 28, 30, 44, 46. Timeslot indicated by reference numeral 28 is used for transmission from the aggregation node 36 to the BSB indicated by reference numeral 34*c*, and timeslot 44 is used for the opposite direction of traffic on this link (i.e. between nodes 36 and 34*c*). Timeslot indicated by reference numeral 30 is used for transmission from BSB indicated by reference numeral 34*c* to the BSB indicated by reference numeral 34*e*, and timeslot 46 is used for the opposite direction of traffic on this link (i.e. between nodes 34*e* and 34*c*). The need for separate timeslots is driven by the limitations of the radio transceiver at the BSB indicated by reference numeral 34*e*, which typically cannot transmit and receive at the same time.

It is possible for two BSBs, e.g. those indicated by reference numerals 34*c* and 34*e* in FIG. 9 to communicate in timeslots shared by communication between the aggregation node AN 36 and a third BSB, e.g. that indicated by reference numeral 34*d*, if there is sufficient isolation between the links in terms of radio propagation.

Figure 10A:
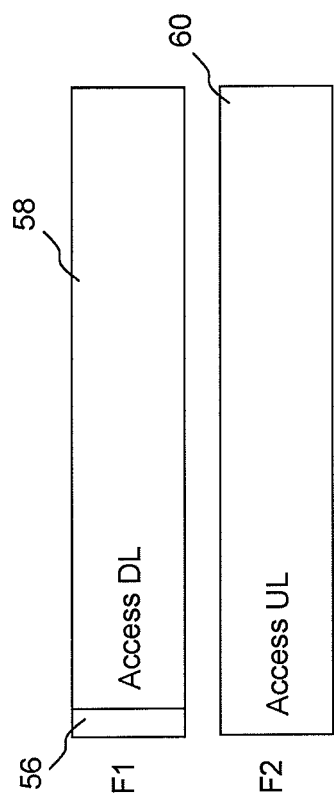
FIG. 10a is a schematic diagram showing a conventional frame structure in a frequency division duplexed system for comparison with FIG. 8b.
Figure 10B:
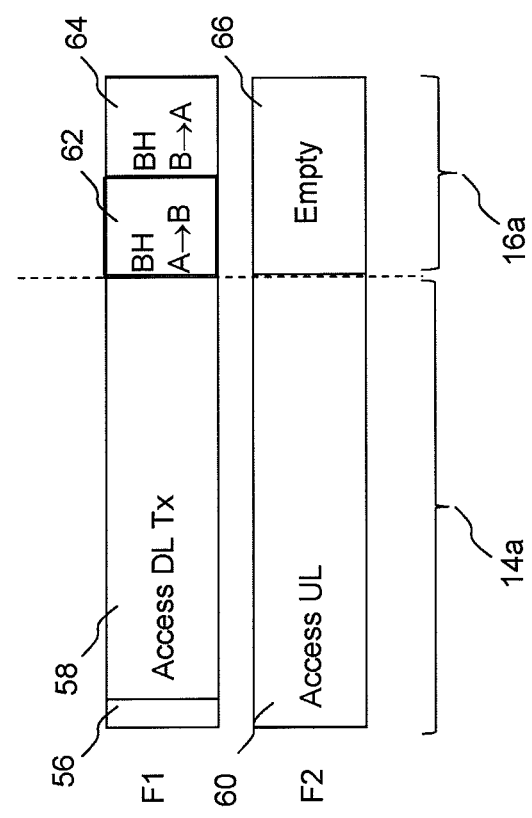
FIG. 10b is a schematic diagram showing a frame structure according to an embodiment of the invention applicable to a frequency division duplexed system.

FIG. 10*b* shows a further embodiment of the invention applied to a frequency division duplexed system. A conventional frequency division duplexed system is shown by FIG. 10*a*, from which it can be seen that the access uplink 60 and downlink 58 are carried by different frequency bands, while preamble 56 is included in the access downlink frequency. In an embodiment of the invention shown in FIG. 10*b*, a timeslot 16*a* on both frequency channels is reserved for radio resource backhaul, but the timeslot 66 on the access uplink frequency channel F2 is not used for radio resource backhaul transmissions. This is to protect the uplink frequencies used by parts of the network that are not employing radio resource backhaul, and is for the same reasons as described above in relation to time division duplexed systems. It can be seen from FIG. 10*b* that the backhaul transmissions are time division duplexed on the access downlink frequency F1 in two timeslots 62, 64. In a multi-hop network, the backhaul transmissions of a frequency division duplexed system may be divided into four timeslots analogously to the frame structure of FIG. 8*b*.

As a variant of the frame structure applied to time division duplexed systems, it is possible to utilise the timeslot indicated by reference numeral 66 in the access uplink frequency band for backhaul transmissions; this may result in interference with access uplink transmissions, but makes more efficient use of radio resource. In this variant, the backhaul transmissions may be frequency division duplexed by the use of the timeslots indicated by reference numerals 62 and 64 at the access downlink frequency for transmission between base stations in one direction and by the use of timeslot 66 at the access uplink frequency for transmission between base stations in the opposite direction.

As described above, in preferred arrangements, base stations in the relay zones are configured with a bespoke antenna system so as to optimise the transceiving of backhaul and access signals. Suitable antenna systems will be described with reference to FIGS. 11-13, in relation to the transceiving of signals from a generic base station 2 with both user equipment 12a and a generic relay node 10.

Figure 11:
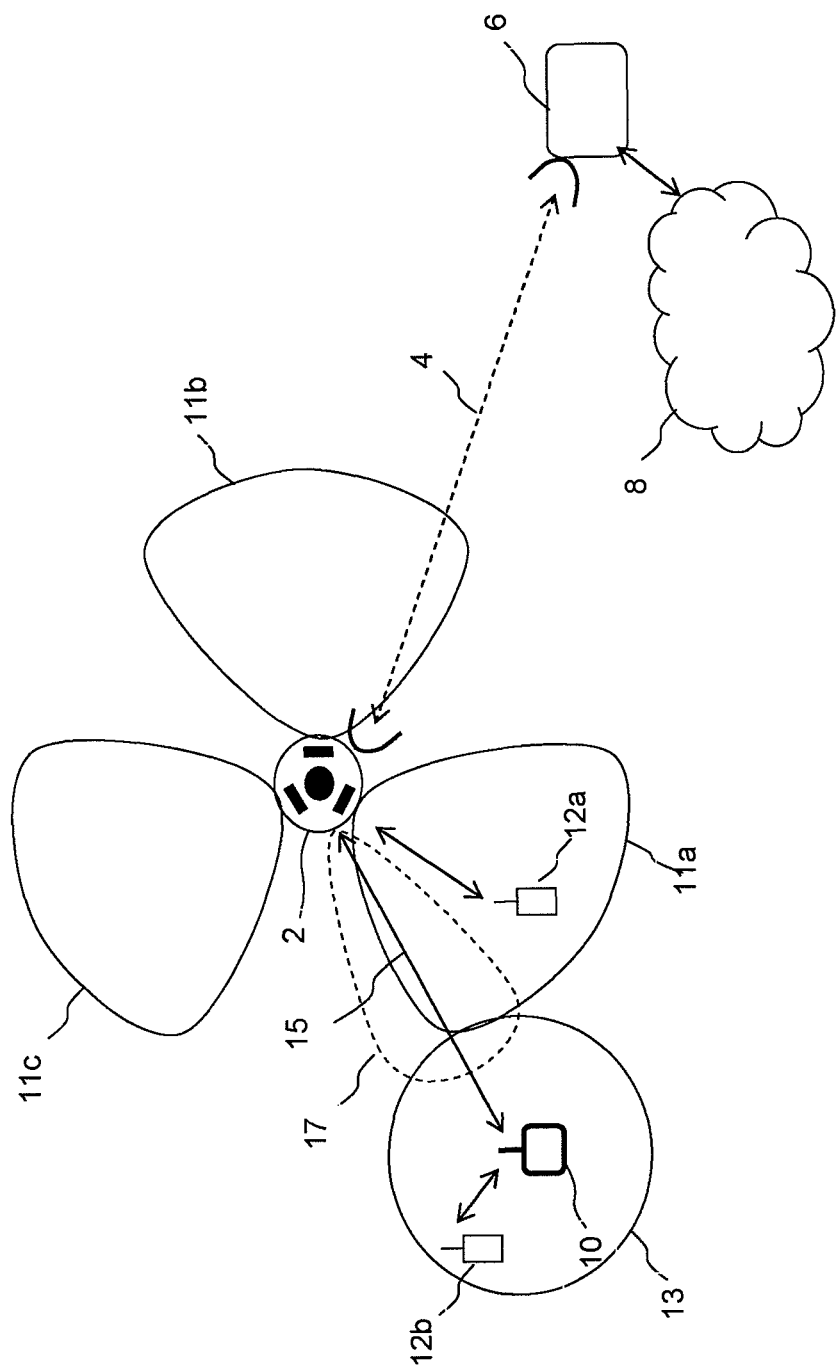
FIG. 11 is a schematic diagram showing a transceiving system utilising an antenna system according to an embodiment of a further aspect of the invention.

Referring firstly to FIG. 11, the backhaul link 15 from the relay node 10 to the base station 2 is conventionally via lobe 11a of the radiation pattern produced by the base station 2, which is optimized for access connections, such as that between the base station 2 and the user equipment indicated by reference numeral 12a. In an arrangement according to this preferred antenna system, the backhaul link between the relay node base station 10 and the base station 2 is carried by a different lobe 17 of the radiation pattern of the base station 2; this is because the base station 2 uses a different antenna system when backhaul messages are transmitted and received than it does when access messages are transmitted and received.

As a result, the link 15 in the direction of the relay node 10 can be optimized by using an antenna beam pointed directly at the relay node. The radiation pattern of the beam 17 can be narrower in azimuth than that of the beam 11a used for access, since it is not necessary to give coverage over the breadth of a given sector; this allows the gain of the beam to be increased, potentially improving the signal to noise and interference ratio of the link to the relay node by increasing the received signal strength and reducing the probability of interference falling within the beam. An improved signal to noise plus interference ratio enables the data rate of the backhaul link to be increased by means of adaptive modulation and coding; as a result, the proportion of time allocated to the backhaul link can be reduced, thereby increasing the potential capacity of the access links and providing more time for use in access than is available in conventional systems. The signal to noise plus interference ratio may be further improved by the use of an additional radiation pattern lobe at the relay node.

Figure 12:
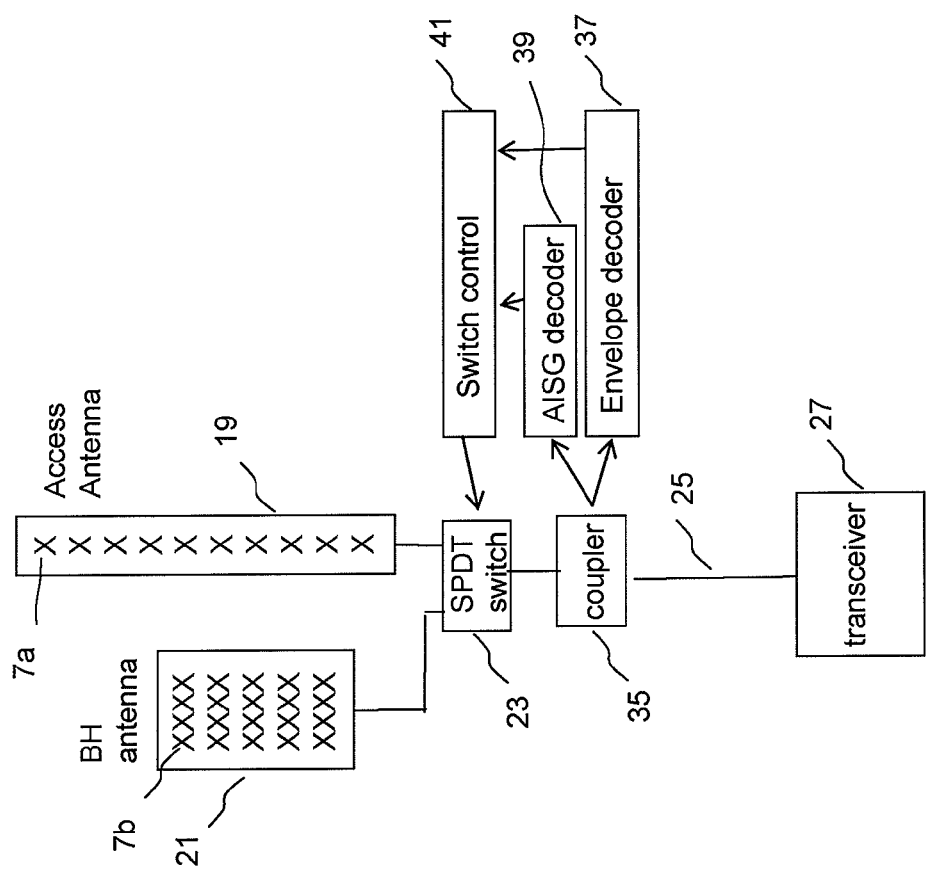
FIG. 12 is a schematic diagram showing an implementation of an antenna selection system forming part of the transceiving system of FIG. 11.
Figure 13:
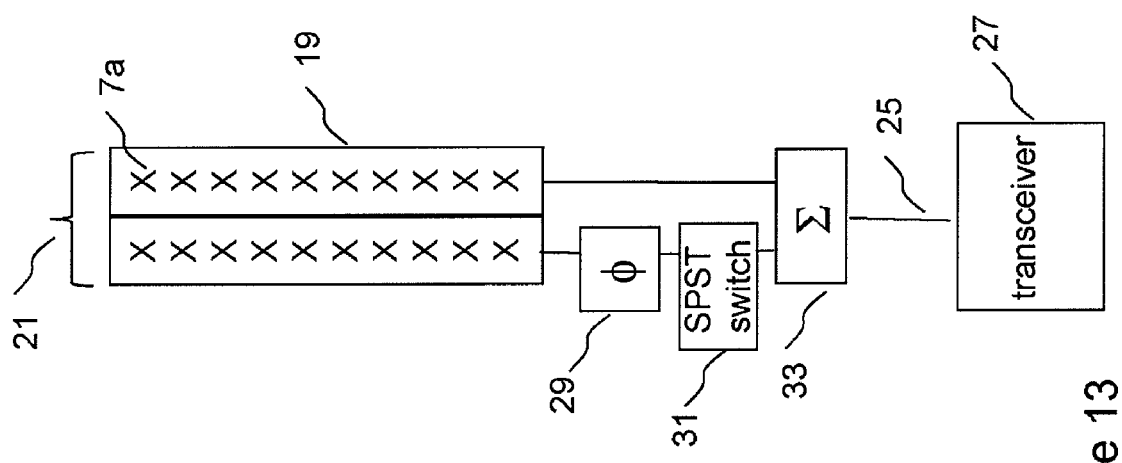
FIG. 13 is a schematic diagram showing a yet further implementation of an antenna system forming part of the transceiving system of FIG. 11.

FIG. 12 shows a block diagram of an exemplary switched antenna system according to an embodiment of the invention. The antenna system comprises a backhaul antenna and an access antenna 19, 21, together with associated control components, as will now be described in more detail. The access antenna 19 is shown as a vertical array of antenna elements 7a; this is a typical structure that gives a broad beam in azimuth and a narrow beam in elevation. On reception, the signals received from the antenna elements 7a are combined together, and on transmission the transmitted signals are split between the antenna elements. The backhaul antenna 21 shown is also constructed from an array of antenna elements 7b; in a preferred arrangement the backhaul antenna 21 is four elements in width rather than a single element wide, as was the case for the access antenna, giving the access antenna a relatively narrower beam in azimuth. However, the skilled person will appreciate that the backhaul antenna 21 could alternatively have a width equivalent to two, three, or more elements and still provide a relatively narrower beam in azimuth. The increased gain associated with the narrower beamwidth in azimuth allows a reduction in the height of the antenna, increasing the beamwidth in elevation, as discussed.

A single pole double throw (SPDT) switch 23 is used to select the backhaul antenna 21 within a backhaul timeslot and the access antenna 19 within an access timeslot. Typically, the switch 23 would be a PIN (P-type Intrinsic N-type) diode switch designed to carry the high power of the transmitted signals.

In one arrangement the antennas 19, 21, switch 23 and associated switch control components 35, 37, 39, 41 are mounted at the top of an antenna tower while a radio transceiver 27 is mounted at the bottom of the tower, for ease of maintenance. The transceiver 27 is connected to the tower top components by a feed cable 25. It is generally costly to install additional cables between the bottom and the top of a tower; hence it is preferable to position the antenna switch 23 at the top of the tower, to remove the need for a second feed cable that would be required if the switch were positioned at the bottom of the tower. It is similarly undesirable to install a control cable between the transceiver 27 and the switch 23. A consequence of the avoidance of the installation of additional cables is that the control of the switch 23 is preferably arranged to be derived from signals present on the feed cable 25. Typically, no existing interface to the feed cables 25 is available that is sufficiently fast to operate at the speed of the backhaul/access switching; accordingly, a method is used whereby a message on an existing antenna control interface, such as the industry standard AISG interface, is used to define switching points with respect to a counter. A counter is then synchronized to the detected power envelope of the transmit/receive waveform.

The operation of the switch control is as follows. Signals are coupled from the feeder cable 25 using a coupler 35 and AISG messages are decoded in an AISG decoder 39. These messages represent the required antenna switching points in terms of the count on a counter. An envelope detector 37 detects the transmit/receive power envelope and passes the detected waveform to the switch control 41. The switch control 41 synchronises a conventional flywheel counter with the power envelope signal, such that a given count on the counter consistently represents a given phase of the transmit/receive cycle. A comparator switches the state of the switch at the count values indicated by the AISG message.

FIG. 12 represents the transmission and reception of signals using antennas with a single state of polarization; transmission and reception of signals on orthogonal polarisations can be carried out by employing antennas with dual polarization outputs and duplicating the switch 23, feed cable 25 and transceiver 27; one set of switch control circuitry 35, 37, 39, 41 could be used to control the switches 23 on both polarizations. Similarly, any of the embodiments can be implemented in dual polar form by the suitable duplication of signal paths.

Alternative configurations of the switched antenna system include use of two transceivers in the place of the radio frequency switch 23, and the switching between access and backhaul mode would be carried out by a digital multiplexer. As a further alternative, shown in FIG. 13, elements 7a can be switched in or out of use according to whether a backhaul antenna 21 or access antenna 19 is required. As shown, the array has two columns of ten elements 7a. For access mode, a single column 19 is connected through a combiner/splitter 33 to a transceiver 27. For backhaul mode, the second column is switched in, thereby narrowing the beam. A phase shifter 29 determines the relative phase between the signals on the first and second antenna array columns referred to the transceiver 27. Adjustment of the phase shifter 29 will steer the backhaul beam in azimuth; the adjustment could be an electronic or a purely mechanical path length adjustment. The single pole single throw (On/Off) switch 31 could be implemented using PIN diodes, and the control technique could be similar to that used in the embodiment of FIG. 12.

As a yet further alternative, (not shown) the antenna system can be embodied by a multi-element beamformer, comprising an array of weight values that are used to control the amplitude and phase of signals transmitted and received by an array of antenna elements. A beamformer controller controls the application of weights to be suitable for producing the antenna patterns appropriate for backhaul or access mode. The application of weights to antenna elements using a beamformer is well known in the field of phased array radar and electronic beam steering generally. The benefit of the electronic beam steering technique is the degree of control it gives over the precise shape of the antenna beam, thereby allowing the optimization of the link gain or other system parameters. In addition, nulls may be steered in the direction of interference sources to maximize the signal to noise plus interference ratio.

In the description above relating to various configurations for the antenna selection system, the backhaul and access signals are described as being transceived within the same frequency band. It will be appreciated that this covers at least two different arrangements: a first in which the respective signals use the same channel (implying time division only), and a second in which the respective signals use different, e.g. adjacent, channels (implying frequency division as well as time division). Whilst the above embodiments relate to the former, time-division only, arrangement, the scope of the invention covers both arrangements. Indeed, in order to accommodate the latter arrangement, the antenna selection system would additionally include a frequency switching component.

The above embodiments are to be understood as illustrative examples of the invention, and other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of configuring a cellular wireless communications network comprising a first base station, a second base station, a further base station and a user equipment terminal, the method comprising:
   configuring said first base station in a first transmission mode to:
      transceive signals with a user equipment terminal according to a first frame format; and
      communicate with an outside network using a dedicated resource, wherein the dedicated resource is separate from resources associated with transceiving signals with the user equipment terminal;
   configuring said second base station in a second transmission mode to:
      transceive signals with a user equipment terminal and with the further base station according to a second frame format, wherein the second frame format is different than the first frame format, wherein the second base station uses a common resource for transceiving signals with the user equipment terminal and the further base station; and
      communicate with the outside network using a dedicated resource, wherein the dedicated resource is separate from resources associated with transceiving signals with the user equipment terminal and the further base station; and
   configuring said further base station in the second transmission mode to transceive signals with a user equipment terminal and with the second base station according to the second frame format, wherein the further base station uses a common resource for transceiving signals with the user equipment terminal and the second base station, and wherein the further base station communicates with the outside network via the second base station,
   in which the first frame format comprises a downlink portion for transmission of signals from the first base station to a user equipment terminal and an uplink portion for transmission of signals from said user equipment terminal to the first base station, and the transceiving of signals between said second and further base stations according to the second frame format occurs wholly within said downlink portion of the first frame format.

2. A method according to claim 1, including synchronizing the transceiving of signals between the first base station and a user equipment terminal with the transceiving of signals between the second base station and a user equipment terminal and/or with the further base station and a user equipment terminal.

3. A method according to claim 2, in which the second frame format comprises a first downlink portion for transmitting signals from the second base station to a user equipment terminal, a first uplink portion for transmitting signals from the user equipment terminal to the second base station, a second downlink portion for transmitting signals from the second base station to the further base station and a second uplink portion for transmitting signals from the further base station to the second base station, and the method further comprises adjusting the first and second uplink portions so as to synchronise the first uplink portion with said uplink portion associated with the first frame format.

4. A method according to claim 1, including:
   configuring the second base station to transceive signals with a user equipment terminal and with the further base station according to a third frame format; and
   configuring the further base station to transceive signals with a user equipment terminal and with a third base station according to the third frame format,
   in which said transceiving of signals between the further base station and the third base station according to the third frame format occurs wholly within said downlink portion of the first frame format.

5. A method according to claim 4, in which the second base station transceives signals with the further base station in a different part of the downlink portion of the first frame format to that utilized for transceiving signals between the further base station and the third base station.

6. A method according to claim 1, in which the transceiving of signals between said second and further base stations according to the second frame format occurs wholly within timeslots allocated to transmissions between the first base station and user equipment terminal according to the first format.

7. A method according to claim 1, in which the transceiving of signals between said second and further base stations according to the second frame format occurs wholly within frequencies allocated to transmissions from the first base station to the user equipment terminal according to the first format.

8. A method according to claim 1, further comprising:
transmitting first signals between a user equipment terminal and the second base station by means of a first antenna system of a first type at the second base station; and
transceiving second signals between the second and further base stations by means of a second antenna system of a second type at the second base station, the second type of antenna system being different from the first type of antenna system.

9. A method according to claim 8, comprising connecting the first antenna system to a transceiver for transceiving the first signals and connecting the second antenna system to the transceiver for transceiving the second signals so as to selectively transceive said first and second signals.

10. A method according to claim 9, comprising:
decoding a message indicating a switching point with respect to a count value on a counter;
detecting a characteristic representing a power output of the transceiver as a function of time;
synchronising the counter with the characteristic; and
switching between the first antenna system and the second antenna system in dependence on the count value and the switching point.

11. A method according to claim 10, in which the first antenna system comprises an antenna array having a plurality of antenna elements and the second antenna system comprises a sub-set of said antenna elements, the method further comprising switching between said sub-set of antenna elements in dependence on the count value and the switching point.

12. A method according to claim 11, including applying a first set of amplitude and phase weighting values in respect of said first signals and applying a second, different, set of amplitude and phase weighting values in respect of said second signals.

13. A cellular wireless communications comprising:
a first base station; and
a second base station;
wherein the first base station is configured to:
transceive signals to and from a user equipment terminal according to a first frame format using a first wireless resource; and
communicate with an outside network using a second resource, wherein the second resource is separate from the first resource;
wherein the second base station is configured to:
transceive signals to and from a user equipment terminal and a further base station according to a second frame format using the first wireless resource, wherein the second frame format is different from the first frame format; and
communicate with outside network using a third resource, wherein the third resource is separate from the first resource, and wherein the further base station communicates with the outside network via the second base station;
wherein the first frame format comprises a downlink portion for transmission of signals from the first base station to a user equipment terminal and an uplink portion for transmitting signals from said user equipment terminal to the first base station, and the second and further base stations are configured to transceive signals between the second and further base stations according to the second frame format wholly within said downlink portion of the first frame format.

14. A network according to claim 13, wherein the system comprises:
a first antenna system of a first type at the second base station arranged to transceive signals between the second base station and a user equipment terminal; and
a second antenna system of a second type, different from the first type of antenna system, arranged to transceive signals between the second base station and the further base station.

15. A network according to claim 14, comprising a radio frequency switch for connecting the first antenna system to a transceiver during periods within the frame format that are allocated to transmissions between the second base station and the user equipment terminal and for connecting the second antenna system to the transceiver during periods within the second frame format that are allocated to transmissions between the second base station and the further base station.

16. A network according to claim 15, wherein the first antenna system comprises an antenna array having a plurality of antenna elements, and the second antenna system comprises a sub-set of said antenna elements.

* * * * *